June 26, 1934.  F. A. ENGEL  1,964,044

PIPE JOINT PACKING DEVICE

Filed Oct. 22, 1931

INVENTOR-
Frank A. Engel.
BY
S. J. Cox.
ATTORNEY-

Patented June 26, 1934

1,964,044

UNITED STATES PATENT OFFICE 1,964,044

PIPE JOINT PACKING DEVICE

Frank A. Engel, Roselle, N. J., assignor to Inner-Tite Clamp Corporation, Elizabeth, N. J., a corporation of New Jersey Application October 22, 1931, Serial No. 570,386

6 Claims. (Cl. 285—119)

The present improvements relate, in general, to pipe joints and more particularly to a clamp for such joints whereby to insure an effective seal and to prevent leakage about the joint.

A primary object, among others, is to provide a novel clamp of the type indicated which is easy to apply, provides a more effective seal, has a longer life and is more certain in its operation.

A further object of the improvements, is to provide a clamp device which is particularly adapted for use with the bell and spigot type joints and which will provide an effective seal at all times and will not be impaired or require service in case of movement of the pipe sections.

The general improvement of this type of device, constitutes a further object of the invention. Other objects and advantages will be apparent upon reference to the accompanying specification and drawing, in which—

Figure 1:
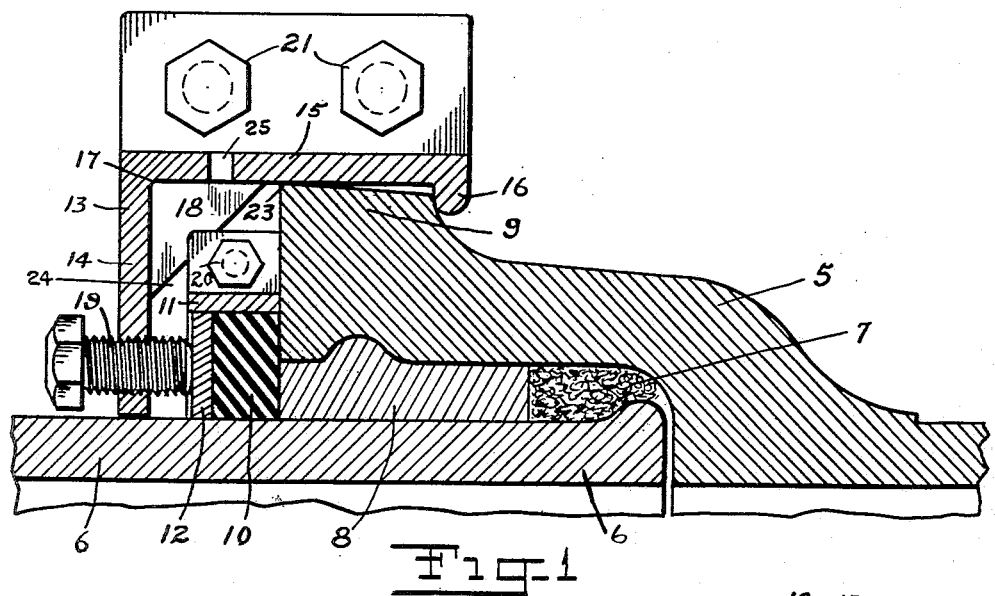
Fig. 1 is a longitudinal half section through a pipe joint illustrating one embodiment of the improvements.
Figures 2, 3:
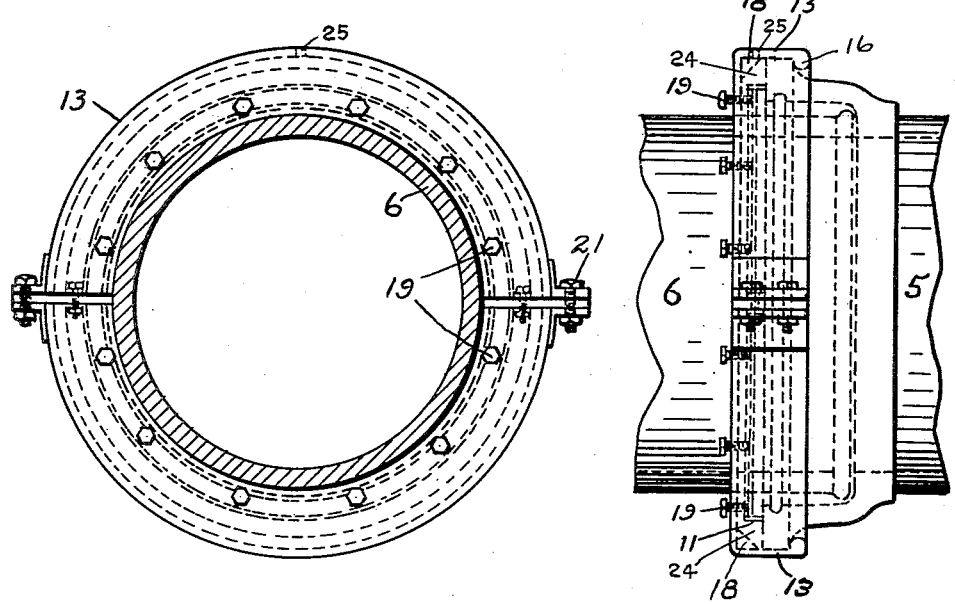
Fig. 2 is an end elevation.
Fig. 3 is a side elevation of the joint with the improvements applied thereto.

Referring to the drawing, the numeral 5 represents the bell end of a pipe section and 6 designates the spigot end of the adjacent pipe section, fitting within the bell end and secured therein by a packing of oakum 7 and lead 8 or other suitable material. The bell end is provided with the usual annular flange or shoulder 9, which completes the familiar structure commonly found in pipe joints of the bell and spigot type.

An annular gasket or packing ring 10 of rubber or other suitable compressible material is provided about the spigot section 6 and contacts the lead seal as well as the end of the bell section having a snug fit with all these elements. Surrounding this gasket, is a collar or annular keeper 11 which loosely engages the end face of the bell section. As illustrated, this keeper is of slightly greater width than the gasket 10 and forms therewith an annular recess, in which an annular compression ring or follower 12 is disposed.

The foregoing elements may generally be designated as packing elements and it is an object of the improvements not only to insure the most effective application thereof but also to house and protect them from corrosive and other agencies. In attaining this end, the improvements provide a combined clamp ring and housing 13 which serves in numerous capacities. This member 13 is preferably although not necessarily an annular housing which extends from the shoulder 9 of the bell section 5 to the spigot section, thereby completely enclosing the joint and the packing elements 10 to 12.

As illustrated in Fig. 1, the clamp or housing 13 comprises annular walls 14 and 15 which are disposed substantially at right angles to each other. The wall 15 extends horizontally and substantially parallel to the pipe sections and is of sufficient extent to extend over the packing elements and over the flange or shoulder 9 of bell section 5. At this point the wall 15 of the housing terminates in an annular lip or bead 16 which engages behind shoulder 9, as illustrated. Manifestly the bead 16 could be replaced by a plurality of spaced lugs, if desired. It is notable that the wall 15 extends from bead 16, undeviatingly in a lateral direction to the angle 17 of the housing, so that it has a smooth, even inner face which may rock about the shoulder 9.

The annular wall 14 of the clamp or housing extends vertically from the wall 15 and joint 17 toward the spigot end 6, where it terminates. In order that the housing may present a more rugged and durable construction, fins or webs 18 may be provided at various intervals. Both walls 14 and 15 are of such an extent that the entire clamp or housing is spaced from the joint and packing elements.

The lower area of wall 14 is provided with a series of spaced threaded holes in which screws 19 are disposed. As illustrated, these screws contact the compression ring or follower 12, and are mounted so that their axes are substantially parallel to the pipe sections.

The foregoing members constitute the elements of the improved clamp, it being understood that the annular members are split and/or bolted together, as seen at 20 and 21 so as to permit application of the elements to the pipe section.

Upon reference to Fig. 1, the advantages of the improved construction may be observed. When the parts are applied, the clamp is seen to have three points of contact, viz, at bead 16, at fulcrum 23 and where screws 19 engage follower 12. Upon screwing screws 19 inwardly, they travel in a line parallel to the pipe sections. Likewise follower 12 is advanced in a parallel direction. This movement causes a compression or squeezing action on gasket 10, tending to force it against the lead portion 8. The gasket is confined between the spigot section and keeper 11, while the pressure applied by follower 12 is normal to, i. e., in a direct line to gasket 10. Therefore, there is no distortion of the fabric and no mutilation of the texture of the gasket. In its compressed state, the gasket is leak-proof, due to the fact, among others, that no interstices have been created therein by reason of pressure applied on the bias, resulting in torn or broken fibres.

The application of the force by screws 19 so that the center of pressure on the follower and gasket always remains in the same plane, parallel to the line of pipe, is of marked importance. It is well known that pipe sections move relative to one another for climatic and other reasons. Therefore, any clamp means which may be effective, at the time of application, may be rendered ineffective shortly thereafter, if the movement of the pipes, causes the clamp to be loosened or moved relative thereto. With the present improvements, it is notable, that the clamp structure is dependent for its anchorage, on only the bell end section. The clamp structure is a one piece affair which clings, so to speak, on the bell end of the pipe section, and is not dependent, for its securement, on any co-operation on the part of the spigot end section, or upon any definite or fixed position of such section.

The clamp therefore does not clamp onto or exert a grip on spigot end 6. Accordingly, pipe sections 5 and 6 may move relative to one another without kicking or disturbing the clamp structure. In this manner the seal is unimpaired, and the effectiveness derived from the clamp at the time it is mounted, is preserved and kept throughout the life of the pipe, regardless of relative movements between sections thereof.

A further feature of importance resides in the leverage and freedom of movement derived from the one piece clamp 13, at the time of mounting. Upon initial application of pressure to screws 19, the clamp 13 may rock about fulcrum 23, thereby shifting the position of bead 16 and the clamp to a more effective position. Thereupon, added pressure on the bolts and tightening thereof, may cause an imperceptible outward thrust on wall 14, wherein bead 16 is a fulcrum. This freedom of movement afforded by the clamp 13, is very advantageous in accommodating the clamp to the bell so as to derive the ultimate pressure and sealing effect from the packing elements.

Furthermore, the mechanical advantage resulting from the leverage action of clamp housing 13 combined with that of the screws 19 which are threaded directly in the wall of the housing, cannot be overemphasized. This construction affords a greater degree of pressure for application to the gasket. Manifestly, this indicates a more effective seal so that the joints can withstand greater pressures from within, and without leakage.

Upon reference to Fig. 1, it will be seen that the housing 13 is provided with a port or opening 25, for the introduction of sealing material. Only one such port is necessary for the purposes of the invention, and it may be located in the wall 15 or in wall 14 depending upon which is uppermost. After the clamp has been applied and adjusted to position, an annular channel 24 is defined between the housing 13 and the pipe sections. This channel is partially occupied by packing elements 10 to 12, there being considerable free space however, as illustrated.

Since the housing 13 comprises a split ring bolted together, as at 21, a suitable cement or other packing may be employed at the juncture of the half ring sections, so that the channel 24 will constitute a true annular receptacle. This channel or receptacle may now be filled, through port 25, with a plastic composition having a coal tar or bituminous base, or with any other material suitable for the purpose. The entire channel 24 may thus be filled up to and including the port 25. Upon setting, this plastic composition will form a relatively fixed or solid mass. The mass does not become hard or brittle, and therefore is not affected by movements of the pipe sections. It is apparent that this mass completely envelops the packing elements 10 to 12 and therefore excludes them from air, moisture and other corrosive agencies. Since the plastic mass is impervious to air, moisture and the like, it is manifest that the life of the elements 10 to 12 is prolonged indefinitely and the effectiveness of the clamp is increased many fold. The inner face of housing 13 as well as the inner portions of screws 19 will likewise benefit by the presence of the plastic mass and their period of usefulness will be increased. When the annular space 24 is filled with the plastic mass above referred to, a leak detecting device is thereby provided. In the event that a perfect seal has not been effected, gas leaking through the bell and spigot joint will pass up through the plastic material to the surface thereof where it will appear in the form of bubbles. These bubbles will be plainly visible through the port 25 in the upper half of the housing 13 thereby indicating to the observer that a complete seal has not yet been provided.

It is evident that a clamp of the type revealed in the improvements, will afford an effective seal for a greater period of time than one comprising several parts. The one-piece clamp or housing, provides an effective closure and protecting member, which will protect the packing elements from deterioration and decay by shielding them from destructive agencies, even without the use of sealing material in channel 24. Attention is also invited to the fact that the clamp is very easy to manipulate. The housing 13 is a one-piece element in which the screws 19 are disposed. After packing elements 10 to 12 are applied, it is only necessary to handle one element, viz, clamp 13, in order to complete the seal. This is in marked contrast to the familiar three and four piece clamp. It is also notable that the angular housing is well spaced from the end face of the bell section so as to afford ample space for the accommodation of the packing and plastic filler. Increased leverage and a more effective compressive force for application to the gasket, results in having the clamp or housing 13 spaced from the packing elements.

The present improvements may be used either with or without the plastic filler, and in the latter instance, the port 25 need not be provided, or if so, may be suitably plugged. The housing 13 does not necessarily have to be right angled, but may take other shapes and forms, so long as the ascribed functions are attained. In the illustrated embodiment, the housing may be rounded off at the corner 17, if desired.

Various other modifications within the scope of the present improvements may occur to those skilled in the art and may be made without departing from the scope and purview of the invention.

I claim:

1. A clamp for a pipe joint of the bell and spigot type comprising an annular gasket snugly surrounding the spigot end pipe section and engaging the bell end pipe section, an annular follower behind said gasket, an annular keeper surrounding said gasket and follower, a substantially right angled housing spaced from and enclosing the aforementioned elements and extending from the spigot section over and around the shoulder of the bell section thereby providing an annular enclosure adapted to receive a plastic filler, said housing having a port affording access to the interior of said housing, means on said housing engaging the shoulder of the bell section, and screws extending through the wall of the housing and aligned with and engaging said follower.

2. A clamp for pipe joints of the bell and spigot type comprising annular packing elements surrounding the spigot section and snugly engaging the end face of a bell section, an integral housing engaging the shoulder of the bell section and extending over said packing elements and thence projecting inwardly to the spigot section, said housing being spaced from said packing elements for providing an enclosure thereabout, a filling port in said housing, a plastic filling mass enveloping said packing elements and confined in position by said housing, and screws in said housing engaging said packing elements.

3. A clamp for pipe joints of the bell and spigot type comprising annular packing elements surrounding the spigot section and snugly engaging the end face of a bell section, an integral housing engaging the shoulder of the bell section and extending over said packing elements and thence projecting inwardly to the spigot section, said housing being spaced from said packing elements for providing an enclosure thereabout, screws in said housing engaging said packing elements, a plastic filling mass enveloping said packing means and confined in position in said housing and a leak detecting port in said housing whereby gas leaking through the joint and issuing through the plastic mass may be observed without disturbing the housing.

4. In a bell and spigot joint having a calk seal, a supplementary sealing means comprising an annular gasket aligned with the calk seal, an annular keeper ring surrounding said gasket, an annular follower ring behind and engaging said gasket, a clamp member comprising an angular ring having lugs engaging behind the shoulder of the bell section and having a portion extending thence beyond the face of the bell section and another portion extending inwardly into proximity with the spigot section, the extent of the said portions being such as to space the clamp member from the supplementary sealing means, and means in that portion of the ring adjacent the spigot section for engaging the follower ring for maintaining pressure in the gasket.

5. In a bell and spigot joint having a calk seal, a supplementary sealing means comprising an annular gasket having two faces substantially at right angles to each other for snugly engaging the calk seal and adjacent portions of the bell and spigot sections, an annular keeper ring surrounding the gasket and of greater depth than the gasket whereby said ring projects beyond the gasket, and an annular follower ring having a broad face and of less diameter than the keeper ring and engaging the annular face of the gasket, a clamp member comprising an angular ring having lugs engaging behind the shoulder of the bell section and having a portion extending thence beyond the face of the bell section and another portion extending inwardly into proximity with the spigot section, the extent of the said portions being such as to space the clamp member from the supplementary sealing means, and means on said clamp ring engageable with said follower ring for exerting pressure on said follower ring for advancing it within the keeper ring and for maintaining pressure on said gasket, said last named means having contact with the broad face of the follower ring at a point spaced from the edges thereof.

6. In a bell and spigot joint having a calk seal, a supplementary sealing means comprising an annular gasket, keeper ring and follower ring, said keeper ring engaging the end face of the bell section and spaced from the spigot section thereby defining an annular channel aligned with the calk seal, said gasket being disposed within said channel and engaging said calk seal and said follower ring engaging behind said gasket and extending from the spigot section to the keeper ring for providing therewith a closure for said channel thereby completely confining said gasket, a clamp member comprising an angular ring having lugs engaging behind the shoulder of the bell section and having a portion extending thence beyond the face of the bell section and another portion extending inwardly into proximity with the spigot section, the extent of the said portions being such as to space the clamp member from the supplementary sealing means, and means on the clamp ring engageable at a point between the edges of said follower ring for maintaining pressure on the follower ring and gasket.

FRANK A. ENGEL.